Sept. 22, 1925.

E. M. HEWLETT ET AL

METHOD OF CALIBRATING INSTRUMENTS FOR
THE TRANSMISSION OF ANGULAR MOTION

Filed April 12, 1923

1,554,915

Inventors:
Edward M. Hewlett,
Waldo W. Willard,
by *Their Attorney*

Patented Sept. 22, 1925.

1,554,915

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

METHOD OF CALIBRATING INSTRUMENTS FOR THE TRANSMISSION OF ANGULAR MOTION.

Application filed April 12, 1923. Serial No. 631,728.

*To all whom it may concern:*

Be it known that we, EDWARD M. HEWLETT and WALDO W. WILLARD, citizens of the United States, residing at Schenectady, county of Schenectady, State of New York, have invented certain new and useful Improvements in Methods of Calibrating Instruments for the Transmission of Angular Motion, of which the following is a specification.

Our invention relates to a method of calibrating instruments or devices used in the transmission of angular motion and has for its object a method whereby the instruments may be calibrated in such manner that they may be connected together so as to operate in synchronism.

Our invention has particular application in the synchronization of instruments for the transmission of angular motion of the type having an alternating field rotatably and inductively cooperating with a polycircuit armature winding. Such instruments have an infinite number of possible angular stops or positions, and are therefore particularly adapted for purposes requiring extreme accuracy. When thus used the various instruments in a given system must be synchronized or coordinated with great accuracy in order that the accuracy of the instrument itself may be appreciated. The synchronization of the instruments may be and ordinarily is accomplished by comparing the instruments after they have been connected into a system and setting their indicators on zero. This is a tedious process which gives unreliable results, especially in complicated systems involving a large number of instruments located at remote points.

In accordance with our invention we mark the terminals of each instrument and give each instrument a standard test whereby we are enabled to set each instrument on a definite zero so that the various instruments of a system can be connected together to operate in synchronism without the necessity of subsequent coordination or zero setting.

Figure 1:
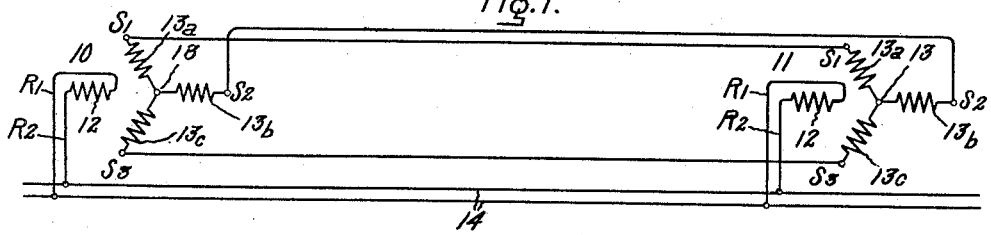
Figure 4:
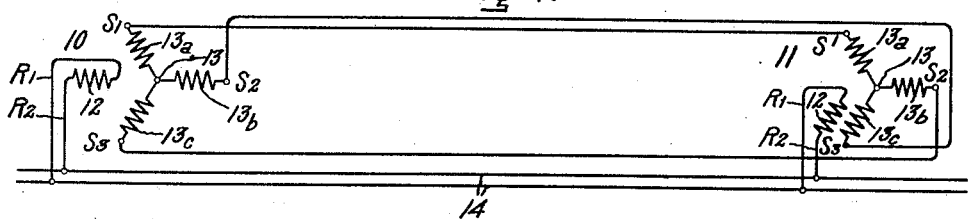
Figure 5:
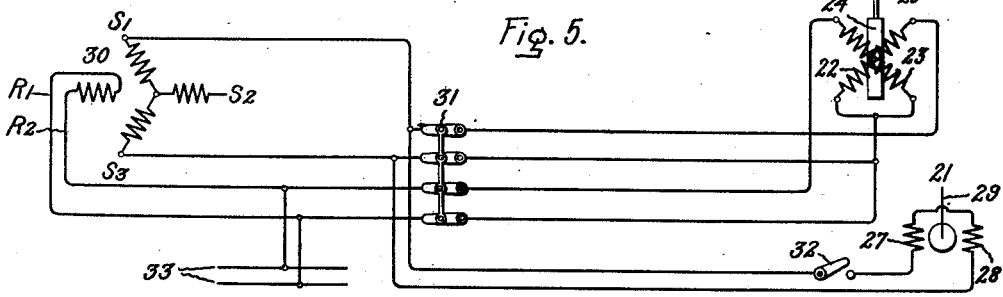
Figure 6:
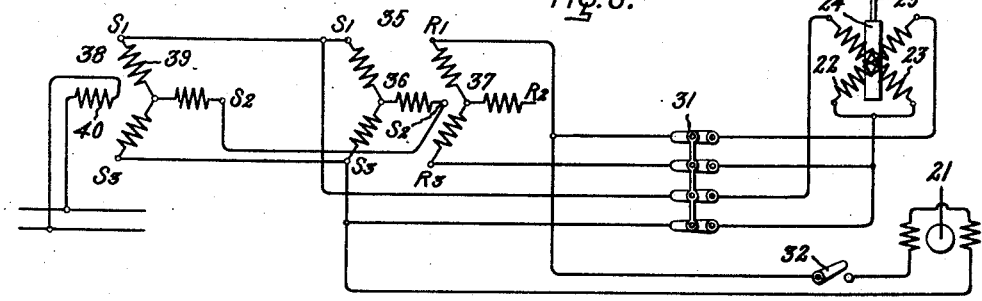
Figure 2:
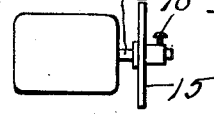
Figure 3:
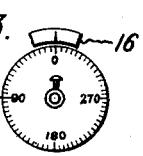

For a more complete understanding of our invention reference should be had to accompanying drawings in which Fig. 1 shows a system for the transmission of angular motion to which our invention is applicable; Fig. 2 is a side elevation view of a typical transmitting or receiving instrument; Fig. 3 is an end elevation view of the instrument; Fig. 4 shows a possible error resulting from connecting the instruments improperly. Fig. 5 shows in diagrammatic form means for calibrating the instruments embodying our invention, while Fig. 6 shows a modified form of our invention.

Referring to Figs. 1 of the drawing, we have shown our invention as applied to instruments for the transmission of angular motion in which both the sending instrument 10 and the receiving instrument 11 are provided with a single circuit field winding 12 and a polycircuit armature winding 13. As shown in the drawing, the field windings 12 of the transmitting and receiving instruments each consist of a single coil which is adapted to be energized from a suitable source of alternating current whereby an alternating flux is set up interlinking with the associated armature winding 13. Preferably, the field windings are mounted on the rotor elements of the instruments, while the armature windings are mounted on the stator elements, the two windings in each instrument being in inductive relation. As shown in the drawing, the armature windings each comprise three coils, or legs, $13^a$, $13^b$ and $13^c$, which are connected in Y relation. Obviously, if desired, the armature coils may be connected in delta.

In the operation of such instruments, the rotor windings are connected to a suitable source of alternating current 14, while like points of the stator windings are interconnected. When the two instruments are connected in the relation shown in Fig. 1, the two rotors will stand in corresponding angular positions with relation to their field windings in which positions the voltages induced by the field windings in the various legs of the interconnected armature windings are exactly equal and opposite and hence no current flows in the armature windings. Upon movement of the rotor of the transmitting instrument 10, the values of the various voltages induced in the legs of the armature windings of the transmitter are changed whereby a current flow is set up in the armature windings and the resulting torque exerted on the rotor of the receiving instrument causes it to follow the rotor of the transmitting instrument. As shown in Figs. 2 and 3 the rotor of each instrument is provided with a suitable indicating device such as a dial 15 calibrated in degrees, this dial cooperating with a stationary reference mark 16. The dial 15 is releasably secured to the rotor shaft 17 of the instrument, for example, by means of a clamping screw 18 whereby the dial may be loosened, turned on the shaft and secured in any desired angular position thereon.

Obviously, if like points of the armature windings of the transmitting and receiving instruments are not connected together, the rotor of the receiving instrument will not take up a position corresponding to the position of the transmitting instrument. An example of this latter condition is illustrated in Fig. 4 in which terminals $S_2$ and $S_3$ on the receiving instrument are reversed. The rotor of the receiving instrument in this case assumes a position of 60 degrees displacement with relation to the rotor of the transmitting instrument. Likewise, if the terminals of the field windings are wrongly connected to the source of supply an error will result. This error will obviously amount to 180 degrees, since the polarity of the field winding will be reversed.

Therefore, for operation of the devices in a predetermined manner, corresponding terminals of the armature windings must be connected together and the field windings must be connected in a definite relation to the source of supply. In accordance with our invention we number the armature terminals $S_1$, $S_2$ and $S_3$, in a definite order, for example, in a clockwise direction as shown in Fig. 1, looking toward a definite end of the instrument, such as the slip ring end, and also number the terminals of the field windings $R_1$ and $R_2$ in the same order. With the terminals thus numbered the instruments may be connected correctly, as shown in Fig. 1, so that their rotors will be in angular agreement.

The correct connection of the instruments in this manner and resulting synchronization of their rotor elements, however, is obviously not alone sufficient to assure the same indication on the dials, but each dial must be set on zero, for example, and secured to the rotor while the rotor is in a definite position. In accordance with our invention we place the field winding, or rotor, in a definite electrical zero position with relation to its associated armature winding for the zero setting of the dials. By thus setting all of the instruments on a definite zero, their dials will all give the same reading when they are properly connected as shown in Fig. 1.

The particular electrical zero position of the rotor which we have selected is that in which no voltage is induced across the terminals $S_1$ and $S_3$. This position is shown in Fig. 1 in which each field winding 12 stands midway between the legs $13^a$ and $13^c$ of the cooperating armature winding. It will be observed that with this position of the field winding, equal voltages are induced in legs $13^a$ and $13^c$, so that there will be no voltage across the terminals $S_1$ and $S_3$. Obviously, to satisfy this condition of zero voltage across terminals $S_1$ and $S_3$, the field winding or rotor may be in one of two positions 180 degrees apart. We accordingly choose a definite one of these two positions as the electrical zero position for the rotor.

It will be observed that when the field winding 12 is turned from the zero position shown in Fig. 1, a voltage will be induced across the terminals $S_1$ and $S_3$, the direction of this voltage depending on the direction of rotation given the rotor and also depending on which one of the two possible zero positions the rotor happens to have been in. In accordance with our invention we turn the rotor in a predetermined direction, for example, in a clockwise direction when looking toward the slip ring end of the instrument. We also compare the direction of the voltage induced across the armature terminals $S_1$ and $S_3$ with the direction of the voltage applied to the field winding 12. Since the direction of the voltage across terminals $S_1$ and $S_3$ will be reversed if the voltage applied to field winding 12 should be reversed, it will be observed that this comparison offers a definite check on the direction of the voltage induced across the terminals $S_1$ and $S_3$. In this manner we are enabled to determine a particular one of the two positions of the field winding 12 giving zero voltage across terminals $S_1$ and $S_3$ so that the rotor can be accurately set on a true electrical zero in which position it is held while the dial is being clamped to the rotor in its mechanical zero position.

Any suitable indicating means may be used in calibrating instruments for the transmission of angular motion in accordance with our invention. Referring to Fig. 5, we have shown a meter 20 similar to a power factor meter for comparing the voltages in the field and armature windings, and a suitable vibrating reed galvanometer 21 for effecting the zero setting of the field winding. The meter 20 comprises two coils 22 and 23 situated at right angles to each other cooperating with which is an iron bar 24 carrying a pointer 25 which moves over a suitable stationary scale 26. The galvanometer 21 comprises an electromagnet energized by two coils 27 and 28 between the poles of which vibrates a stationary flexible reed 29 having a definite polarity.

Assuming that it is desired to calibrate an instrument 30 which may be either a transmitting or a receiving instrument of the type shown in Fig. 1, the field winding terminals are first marked $R_1$ and $R_2$ and the armature winding terminals marked $S_1$, $S_2$, and $S_3$, in clockwise order as previously described. Meter 20 is then connected to the instrument in some predetermined manner, for example, coil 22 is connected across armature terminals $S_1$ and $S_3$, and coil 23 across field winding terminals $R_1$, $R_2$, a disconnecting switch 31 being interposed in the connections. The galvanometer 21 is connected across armature terminals $S_1$ and $S_3$, through a disconnecting switch 32.

A source of alternating current 33 is applied to the field winding and the field winding first set in a position of zero voltage across terminals $S_1$ and $S_3$. To do this meter 20 is disconnected by opening switch 31 and the galvanometer connected by closing down switch 32, the field winding being then turned until the reed 29 ceases to vibrate, indicating zero voltage across armature terminals $S_1$ and $S_3$. A particular one of the two possible positions of the field winding satisfying this condition is now selected, switch 31 being closed and switch 32 opened, the field winding being held in its approximate zero position. It will be observed that needle 25 will be deflected, for example, to the left under the influence of coil 23 which, being connected across terminals $R_1$ and $R_2$, is energized from the supply source 33, coil 22 being de-energized since it is connected across terminals $S_1$ and $S_3$. The field winding is now turned slightly in a predetermined direction, such as clockwise looking at the slip ring end of the instrument, and the resulting deflection of needle 25 noted. It will be observed that when the field winding is turned a voltage is induced across terminals $S_1$ and $S_3$, which voltage is impressed on coil 22 of meter 20. Assuming that a position on the field winding such that the voltage induced across armature terminals $S_1$ and $S_3$ upon clockwise rotation of the field winding from this position is in the same direction as the voltage across the rotor terminals $R_1$ and $R_2$ has been selected as the electrical zero position, then upon deflection of pointer 25 in a direction to indicate the condition, such as toward the right, back toward zero, it will be known that the field winding was in the electrical zero position chosen. Should the pointer, however, move farther toward the left then the field winding must be turned through 180° to its true electrical zero.

After the electrical zero position has thus been determined, switch 31 is opened and switch 32 closed, and the field winding set accurately in this zero position by turning it slightly until reed 29 ceases to vibrate. The reed 29 has a natural period of vibration which is tuned to the frequency of the source of supply 33. The reed will, therefore, vibrate upon the slightest voltage applied across armature terminals $S_1$ and $S_3$. The field winding is now clamped or suitably held in the electrical zero position thus found and the indicating dial 15 secured to the rotor carrying the field winding in mechanical zero position with relation to the stationary mark 16.

As thus calibrated the instruments for transmitting angular motion may be connected together as shown in Fig. 1 and as thus connected their dials will all give the same reading, that is, the rotor of the receiving instrument which is free, will turn to give the same indication as the instrument being used as a transmitter.

In Fig. 6 we have shown the connections, using the apparatus shown in Fig. 5 for calibrating a so-called transformer 35 which is another instrument used in transmitting angular motion. As shown, the transformer has similar polycircuit armature windings 36 and 37 on its rotor and stator elements respectively, these windings being shown as each comprising three legs connected in Y relation. The purpose of the transformer is to introduce differences in the angular relation of the transmitting instrument and the receiving instrument, for example, to introduce corrections. It is connected between the transmitting and receiving instruments like terminals of the rotor winding 36 and the armature winding of the transmitting instrument being interconnected and like points of the stator windings 37 and the armature winding of the receiving instrument being interconnected, or vice versa. This instrument is described and claimed in our copending application, Serial No. 501,007, filed September 15, 1921.

The transformer terminals are first numbered in a predetermined order, the terminals for the stator winding 36 being numbered $S_1$, $S_2$ and $S_3$ consecutively in a clockwise direction when looking, for example, at the slip ring end, while the terminals of the rotor winding 37 are similarly numbered $R_1$, $R_2$ and $R_3$.

In determining the true electrical zero of transformer 35 in accordance with our invention, a transmitting or receiving instrument 38 is used which has been previously calibrated as described. Like terminals of the armature winding 39 of instrument 38 and stator windings 36 of the transformer are interconnected. The field winding 40 of the instrument 38 is turned to its electrical zero position and held in this position so that the voltage across terminals $S_1$ and $S_3$ of the stator winding 36 is zero. The rotor winding 36 of the transformer is now turned until it is in a position of zero voltage induced across terminals $R_1$ and $R_3$. This position may be conveniently determined by connecting the vibrating reed galvanometer 20 across these terminals.

The field winding 40 of the instrument 38 is now turned slightly from this position whereby a difference of potential is applied to the terminals $S_1$ and $S_3$ of the stator winding 36. Obviously, a similar voltage will be set up across terminals $R_1$ and $R_3$ and the direction of this voltage will be the same or opposed to the voltage across the terminals of the stator winding 36, depending on which one of the two possible positions of zero voltage across terminals $R_1$ and $R_3$ the winding 37 happens to be in. In accordance with our invention we choose a definite one of these two positions as the true electrical zero position, for example, the position of the rotor winding 37 in which the voltage across terminals $R_1$ and $R_3$ has the same polarity as the voltage impressed across terminals $S_1$ and $S_3$ of the stator winding 36. This position may be determined by means of the power factor meter 20 of Fig. 5. Coil 22 of meter 20 is connected across terminals $R_1$ and $R_3$, and coil 23 is connected across terminals $S_1$ and $S_3$ of stator winding 36. When rotor winding 40 is in its electrical zero position, the pointer 25 will stand in some indeterminate position since no voltage is supplied to either of coils 22 and 23. When the field winding 40 is turned, however, if the voltage induced across terminals $R_1$ and $R_3$ is the same in direction as the voltage induced across terminals $S_1$ and $S_3$ then the pointer 25 will move to mid or zero position indicating this condition, whereby it will be known that the rotor winding 37 was in its electrical zero position. In case, however, the polarity of terminals $R_1$ and $R_3$ is different from the polarity of the voltage impressed on the terminals $S_1$ and $S_3$ the pointer 25 will take up a position to the right or the left of its mid position as the case may be, in which event the rotor winding 37 must be turned through 180° to its electrical zero position.

The rotor carrying winding 37 is now set accurately in its electrical zero position, field winding 40 having been clamped in its electrical zero position, by applying the galvanometer 21 to terminals $R_1$ and $R_3$, meter 20 being disconnected. The rotor is then clamped in this electrical zero position and the dial or other suitable indicating device secured to it in mechanical zero position.

With the transformer there is considerable danger of the leads for the rotor winding being brought out wrongly, for example, two of them may be reversed. In accordance with our invention, therefore, we check the marking of the rotor terminals by comparison with the stator. With the generator rotor winding 40 in zero position and transformer rotor winding 37 in the zero position previously determined, the voltages across terminals $R_1$ and $R_2$, and $R_2$ and $R_3$ should be in the same direction respectively as the voltages across terminals $S_1$ and $S_2$, and $S_2$ and $S_3$. These voltage relations may be checked by means of the meter 20 by suitably connecting the meter to these terminals as will be understood by reference to the connections shown for comparing the voltages across terminals $R_1$ and $R_3$ and $S_1$ and $S_3$. In case it is found that the voltage across terminals $R_1$ and $R_2$, for example, is in a direction opposite to the voltage across terminals $S_1$ and $S_2$ then it will be known that two of the terminals of rotor winding 37 are reversed.

It will be observed that with this method of testing the transformer 35, the transformer is temporarily converted into a transmitting or receiving instrument of the type shown in Fig. 1, except that the field winding, represented by winding 36, is stationary while the armature winding, represented by winding 37, is rotatable. The zero setting of the transformer thus found is the position in which the transformer will not introduce any change or correction in the angular relation of the transmitting and receiving instruments between which the transformer is connected.

While we have described our invention as embodied in concrete form and as operating in a specified manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is:

1. The method of calibrating an instrument for the transmission of angular motion provided with a field winding and an armature winding, one of said windings being rotatably mounted and connected to drive indicating means, which consists in impressing an alternating voltage on said field winding whereby voltages are induced in said armature winding, turning said rotatable winding to a position such that said induced voltages have predetermined relations to said impressed voltage, and then setting said indicating means in a predetermined position by adjusting it independently of said rotatable winding.

2. The method of calibrating an instrument for the transmission of angular motion provided with a field winding and a polycircuit armature winding one of which is rotatably mounted and arranged to drive indicating means, which consists in marking the terminals of said windings, applying an alternating voltage to said field winding whereby an alternating field is set up cutting said armature winding, adjusting the relation of said field and armature windings to establish a predetermined relation between the voltage applied to said field winding and the voltage induced in said armature winding, and then setting said indicating means in a predetermined position.

3. The method of calibrating an instrument for the transmission of angular motion provided with a field winding and a polycircuit armature winding one of which is rotatably mounted and arranged to drive indicating means, which consists in marking the terminals of said windings, applying an alternating voltage to said field winding, adjusting the angular relation of said field and armature windings for zero across definite terminals of said armature winding such that upon relative rotation of said windings from this position in a given direction the polarity of the voltage produced across said terminals bears a definite relation to the polarity of the voltage applied to said field winding, and then setting said indicating means in a predetermined indicating position.

4. The method of calibrating an instrument for the transmission of angular motion comprising a field winding on a rotor element, indicating means driven by said rotor, and a polycircuit armature winding on a stator element which consists in marking the terminals of said windings, applying an alternating voltage to said field winding, setting said rotor in an electrical zero position such that a predetermined relation is established between the voltage applied to said field winding and the voltage induced in said armature winding, and then setting said indicating means in a mechanical zero position.

5. The method of calibrating an instrument for the transmission of angular motion comprising a field winding on a rotor element, indicating means driven by said rotor and a polycircuit armature winding on a stator element which consists in marking the terminals of said windings, applying an alternating voltage to said field winding, setting said rotor in a position such that no voltage is induced in a definite circuit of said armature winding and upon rotation of said rotor from this position in a given direction the polarity of the voltage induced in said circuit bears a definite relation to the polarity of the voltage impressed on said field winding, and then setting said indicating means in a predetermined indicating position.

6. The method of calibrating an instrument for the transmission of angular motion comprising a single circuit field winding on a rotor element, indicating means driven by said rotor, and a polycircuit armature winding on a stator element which consists in marking the terminals for said field and armature windings in a predetermined order, applying an alternating voltage to said field winding, setting said rotor in a position of zero voltage across a given pair of armature terminals such that upon rotation of said rotor from this position in a given direction a voltage is produced across said pair of terminals bearing a definite relation to the voltage impressed on said field winding, and then setting said indicating means in a predetermined indicating position.

In witness whereof, we have hereunto set our hands this 11th day of April 1923.

EDWARD M. HEWLETT.
WALDO W. WILLARD.